(12) United States Patent
Chien

(10) Patent No.: US 11,092,525 B2
(45) Date of Patent: Aug. 17, 2021

(54) METHOD AND DEVICE FOR PERFORMING BENDING TEST ON DISPLAY PANEL

(71) Applicants: HKC Corporation Limited, Shenzhen (CN); Chongqing HKC Optoelectronics Technology Co., Ltd., Chongqing (CN)

(72) Inventor: Chung-Kuang Chien, Chongqing (CN)

(73) Assignees: HKC CORPORATION LIMITED, Shenzhen (CN); CHONGQING HKC OPTOELECTRONICS TECHNOLOGY CO., LTD., Chongqing (CN)

(*) Notice: Subject to any disclaimer, the term of this patent is extended or adjusted under 35 U.S.C. 154(b) by 253 days.

(21) Appl. No.: 16/348,040

(22) PCT Filed: Sep. 5, 2017

(86) PCT No.: PCT/CN2017/100494
§ 371 (c)(1),
(2) Date: May 7, 2019

(87) PCT Pub. No.: WO2018/095109
PCT Pub. Date: May 31, 2018

(65) Prior Publication Data
US 2019/0339182 A1    Nov. 7, 2019

(30) Foreign Application Priority Data
Nov. 24, 2016   (CN) .......................... 201611051548.4

(51) Int. Cl.
*G01N 3/20* (2006.01)
*G02F 1/13* (2006.01)
*G02F 1/1333* (2006.01)

(52) U.S. Cl.
CPC ............ *G01N 3/20* (2013.01); *G02F 1/1309* (2013.01); *G02F 1/133305* (2013.01);
(Continued)

(58) Field of Classification Search
CPC ..... G01N 2203/0023; G01N 2203/005; G01N 2203/0282; G01N 3/20; G02F 1/1309; G02F 1/133305
See application file for complete search history.

(56) References Cited

U.S. PATENT DOCUMENTS 10,054,527 B2 *   8/2018  Liu ..................... G01M 99/007
10,197,482 B2 *   2/2019  Gao ......................... G01N 3/20
(Continued)

FOREIGN PATENT DOCUMENTS

CN    203858161 U    10/2014
CN    104897481 A     9/2015
(Continued)

*Primary Examiner* — Jonathan M Dunlap
(74) *Attorney, Agent, or Firm* — Muncy, Geissler, Olds & Lowe, P.C.

(57) ABSTRACT

A method and device for performing a bending test on a display panel are disclosed. The method includes the steps of: providing a fixing member, a pressure exerting member and a driving device, and forming a space in the fixing member; fixing the display panel vertically onto the fixing member, wherein the display panel matches with the space to provide a corresponding space for deformation of the display panel; and driving the pressure exerting member to move in a direction perpendicular to the display panel to exert a pressure onto the display panel. If the pressure exerted onto the display panel is equal to a predetermined pressure for a predetermined time, the driving device controls the pressure exerting member to stop exerting the pressure onto the display panel. The predetermined pressure (Continued)

is a pressure required to drive the display panel to deform and reach a predetermined curvature.

19 Claims, 3 Drawing Sheets

(52) U.S. Cl.
CPC .............. *G01N 2203/005* (2013.01); *G01N 2203/0023* (2013.01); *G01N 2203/0282* (2013.01)

(56) References Cited

U.S. PATENT DOCUMENTS

| | | | |
|---|---|---|---|
| 2003/0192385 A1* | 10/2003 | Uhlik | G01N 3/20 |
| | | | 73/852 |
| 2006/0137465 A1 | 6/2006 | Lee et al. | |
| 2012/0067134 A1* | 3/2012 | Bell | G02F 1/133305 |
| | | | 73/800 |
| 2017/0082526 A1* | 3/2017 | Kuroda | G01N 3/20 |

FOREIGN PATENT DOCUMENTS

| | | |
|---|---|---|
| CN | 105676494 A | 6/2016 |
| CN | 105699878 A | 6/2016 |
| CN | 106680108 A | 5/2017 |
| WO | WO 2010138748 A2 | 12/2010 |

\* cited by examiner

METHOD AND DEVICE FOR PERFORMING BENDING TEST ON DISPLAY PANEL

BACKGROUND

Technical Field

This disclosure relates to a field of testing mechanical properties of a material, and more particularly to a method and a device of performing a bending test on a display panel.

Related Art

In the processes of producing a display panel, the mechanical properties of the display panel (e.g., the bending strength of the display panel and the like) needs to be tested. The common bending strength test includes a three-point bending test and a four-point bending test. In the existing bending strength test, the display panel is horizontally placed on the test device for testing. With the continuous development of technology, the sizes of all kinds of display panels are also ascending, and the own weight of the display panel is also increasing. If the display panel is horizontally placed on the test device for testing, then the display panel is affected by its own weight to sag to further affect the accuracy of the test results.

SUMMARY

This disclosure provides a method and a device for performing a bending test on a display panel that is vertically placed.

In one aspect, the present disclosure provides a method for performing a bending test on a display panel. The method comprises the steps of: providing a fixing member, a pressure exerting member and a driving device, and forming a space in the fixing member; fixing the display panel vertically onto the fixing member, wherein the display panel matches with the space to provide a corresponding space for deformation of the display panel; and driving the pressure exerting member to move in a direction perpendicular to the display panel to exert a pressure onto the display panel. If the pressure exerted onto the display panel is equal to a predetermined pressure for a predetermined time, then the driving device controls the pressure exerting member to stop exerting the pressure onto the display panel. The predetermined pressure is a pressure required to drive the display panel to deform and reach a predetermined curvature.

In another aspect, the present disclosure provides a device comprising a fixing member, a pressure exerting member, and a driving device. The fixing member fixes the display panel vertically. The fixing member is formed with a space, and the display panel matches with the space to provide a corresponding space for deformation of the display panel. The pressure exerting member exerts a pressure onto the display panel. The driving device drives the pressure exerting member to move in a direction perpendicular to the display panel. If the pressure exerted onto the display panel is equal to a predetermined pressure for a predetermined time, then the driving device further controls the pressure exerting member to stop exerting the pressure onto the display panel. The predetermined pressure is a pressure for driving the display panel to deform and reach a predetermined curvature.

In another aspect, the present disclosure provides a device comprising a fixing member, a pressure exerting member, and a driving device. The fixing member fixes the display panel vertically. The fixing member is formed with a space, and the display panel matches with the space to provide a corresponding space for deformation of the display panel. The fixing member comprises a sliding bar, and bearing parts disposed on the sliding bar. The bearing parts are movable linearly on the sliding bar, and are driven to move toward or away from each other to form the space. The pressure exerting member exerts a pressure onto the display panel. A line connecting contact points between the fixing member and the display panel is parallel to a line connecting contact points between the pressure exerting member and the display panel. The driving device drives the pressure exerting member to move in a direction perpendicular to the display panel. If the pressure exerted onto the display panel is equal to a predetermined pressure for a predetermined time, then the driving device further controls the pressure exerting member to stop exerting the pressure onto the display panel. The predetermined pressure is a pressure for driving the display panel to deform and reach a predetermined curvature.

In this disclosure, the to-be-tested display panel is vertically fixed by the fixing member and the driving device drives the pressure exerting member to move in the direction perpendicular to the display panel, to exert a pressure onto the display panel, and further to complete the bending test on the display panel. The test method and device can solve the problems that the large-size display panel tends to be affected by its own weight to sag to affect the accuracy of the test results.

BRIEF DESCRIPTION OF THE DRAWINGS

The embodiments will become more fully understood from the detailed description and accompanying drawings, which are given for illustration only, and thus are not limitative of the present invention, and wherein.

DETAILED DESCRIPTION OF THE INVENTION

Specific structures and function details disclosed herein are only for the illustrative purpose for describing the exemplary embodiment of this disclosure. However, this disclosure can be specifically implemented through many replacements, and should not be explained as being restricted to only the embodiment disclosed herein.

It should also be understood that the terms "comprising" and/or "including" are used herein to describe the features to describe the presence of stated features, integers, steps, operations, units and/or elements without excluding the presence or addition of one or more other features, integers, steps, operations, units, elements, and/or combinations thereof.

Figure 1:
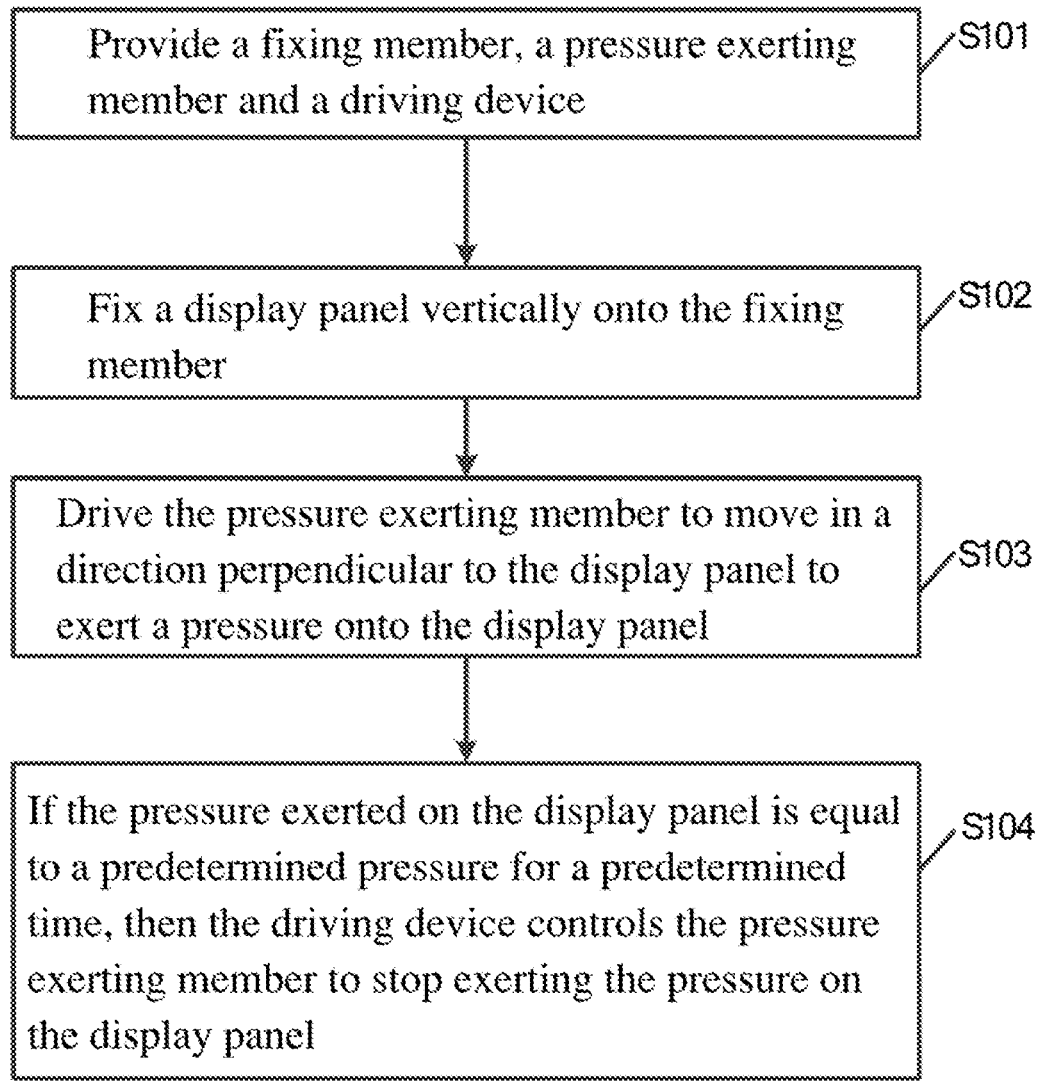
FIG. 1 is a schematic flow chart showing a method for performing a bending test on a display panel in an embodiment of this disclosure.

FIG. 1 is a schematic flow chart showing a method for performing a bending test on a display panel provided by an embodiment of this disclosure. Referring to FIG. 1, the method includes steps S101 to S104.

In the step S101, a fixing member, a pressure exerting member and a driving device are provided, and a space is formed in the fixing member.

Specifically, the step S101 can provide two pressure exerting members, and a line connecting contact points between the fixing member and the display panel is parallel to a line connecting contact points between the pressure exerting member and the display panel.

Figure 2:
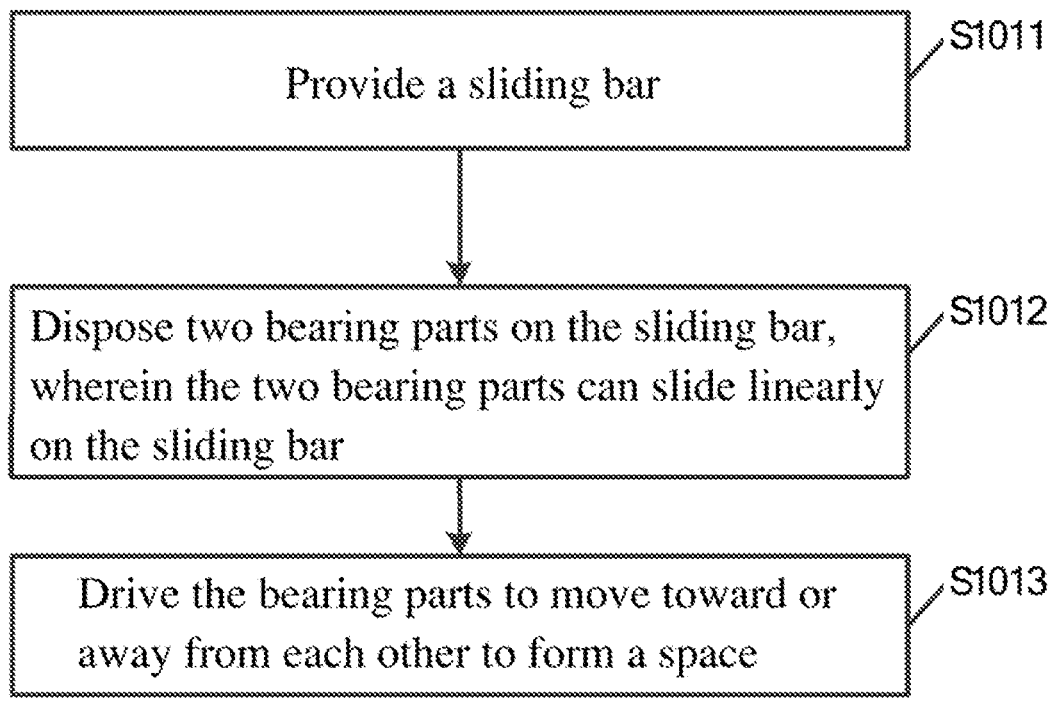
FIG. 2 is a schematic sub-flow chart showing a method for performing a bending test on a display panel in an embodiment of this disclosure.

FIG. 2 is schematic sub-flow chart showing a method for performing a bending test on a display panel provided by an embodiment of this disclosure. Specifically referring to FIG. 2, in the above-mentioned step S101, the step of forming the space in the fixing member includes steps S1011 to S1013.

In the step S1011, a sliding bar is provided.

Specifically, the sliding bar is disposed horizontally.

In the step S1012, two bearing parts are disposed on the sliding bar, wherein the two bearing parts can slide linearly on the sliding bar.

Specifically, the bearing parts are connected to the sliding bar and for bearing the display panel, and the bearing parts and the sliding bar are perpendicular to each other. The above-mentioned two bearing parts can slide on the sliding bar.

In the step S1013, the bearing parts are driven to move toward or away from each other to form the space.

Specifically, the bearing parts are driven to move toward or away from each other to make the bearing parts move toward or away from each other, and further adjust the size of the space formed by the fixing member. By adjusting the size of the space, the test requirements of different sizes of display panels can be satisfied.

Furthermore, the method further comprises steps of: disposing an anti-slip part; and starting the anti-slip part to position the bearing parts. Disposing an anti-slip part on the sliding bar can effectively prevent the space between the fixing members from changing upon testing, and further reduce the test error.

In one embodiment, two pressure exerting members are provided. The positions of the two pressure exerting members are movable so that a gap between the pressure exerting members can be adjusted. By adjusting the size of the gap between the pressure exerting members, the test requirements of different sizes of display panels can be satisfied.

In the step S102, the display panel is fixed vertically onto the fixing member, and the display panel matches with the space to provide a corresponding space for deformation of the display panel.

In a specific implementation, fixing the display panel vertically onto the fixing member can effectively prevent the display panel from sagging due to its own weight, and further influence the test result. In particular, in order to ensure the accuracy of the test results, each edge of the display panel does not contact other objects in the process of testing the display panel.

In one embodiment, the step of fixing the display panel vertically onto the fixing member comprises: smearing an adhesive onto a contact surface between the fixing member and the display panel, so that the display panel is vertically fixed onto the fixing member.

Figure 3:
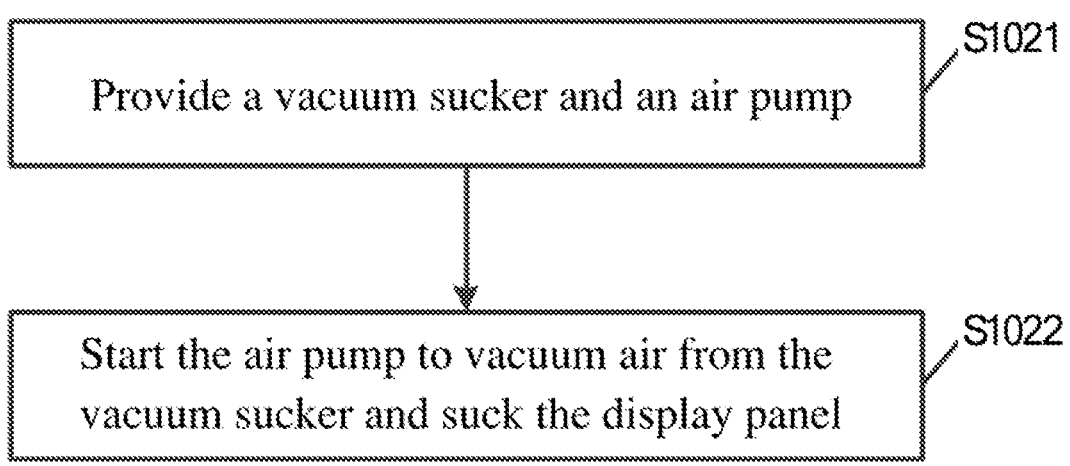
FIG. 3 is a schematic sub-flow chart showing a method for performing a bending test on a display panel in an embodiment of this disclosure.

Please refer to FIG. 3 specifically. FIG. 3 is a schematic sub-flow chart showing a method for performing a bending test on a display panel in an embodiment of this disclosure.

The step S102 of fixing the display panel vertically onto the fixing member includes steps S1021 and S1022.

In the step S1021, a vacuum sucker and an air pump are provided.

Specifically, the air pump is a vacuum pump for vacuuming air from the vacuum sucker.

In the step S1022, the air pump is started or turned on to vacuum air from the vacuum sucker and suck the display panel.

In the step S103, the pressure exerting member is driven to move in a direction perpendicular to the display panel to exert a pressure onto the display panel.

In a specific implementation, the driving device is connected to the pressure exerting member. The driving device includes a drive motor and a ball screw rod, wherein, the drive motor is a servo motor. The ball screw rod includes a screw, a nut, a steel ball, a preload sheet, an inverter and a dustproof device. A power output end of the drive motor is connected to the screw of the ball screw rod. The pressure exerting member is connected to the nut of the ball screw rod through a nut seat. By the driving of the drive motor, the pressure exerting member can linearly reciprocate on the ball screw rod, and the advantages of the high accuracy and the strong stability can be obtained.

In particular, the ball screw rod is vertically connected to the pressure exerting member.

In the step S104, if the pressure exerted on the display panel is equal to a predetermined pressure for a predetermined time, then the driving device controls the pressure exerting member to stop exerting the pressure onto the display panel, wherein the predetermined pressure is a pressure required to drive the display panel to deform and reach a predetermined curvature.

In other embodiments, the step S104 may further be implemented as: recording a magnitude of the pressure exerted upon being broken if the display panel is broken.

In other embodiments, the method further includes providing a debris collection member. The debris collection member is disposed below the display panel upon testing, and can prevent the debris, produced by the broken display panel during the testing process, from falling into the gap of the apparatus, and simplify the cleaning process.

Figure 4:
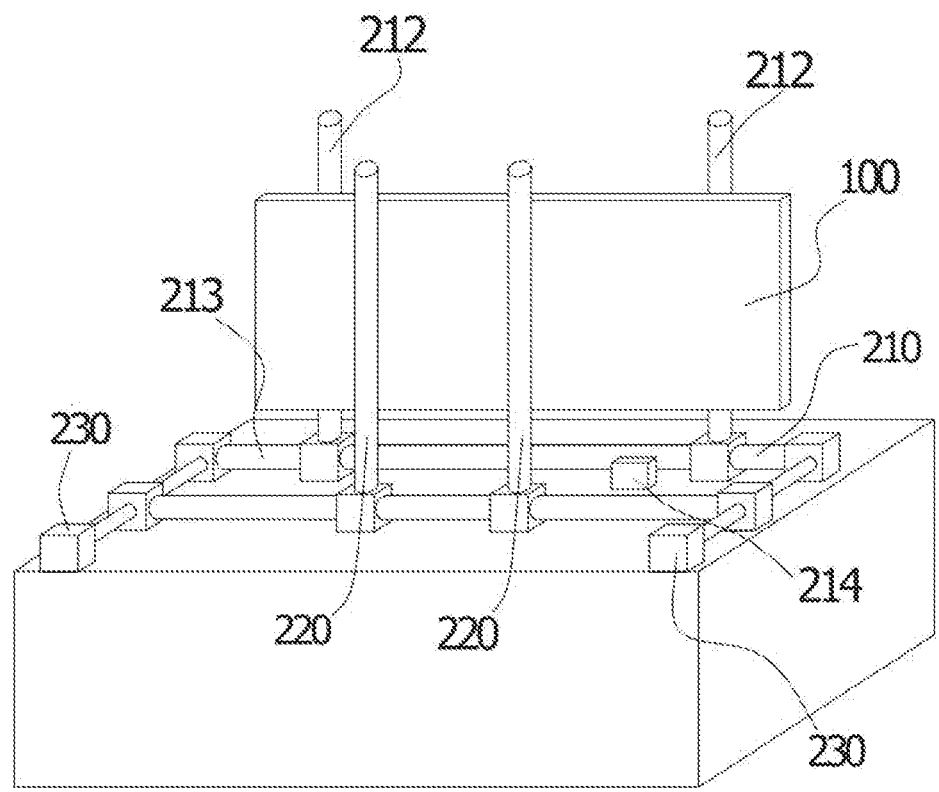
FIG. 4 is a schematic structure view showing a device in an embodiment of this disclosure.

FIG. 4 is a schematic structure view showing a device in an embodiment of this disclosure. Referring to FIG. 4, the device for performing the bending test on a display panel 100 includes a fixing member 210, a pressure exerting member 220 and a driving device 230.

The fixing member 210 fixes the display panel 100 vertically. The fixing member 210 is formed with a space, and the display panel 100 matches with the space to provide a corresponding space for deformation of the display panel 100.

In a specific implementation, two pressure exerting members 220 are provided. A line connecting contact points between the fixing member 210 and the display panel 100 is parallel to a line connecting contact points between the pressure exerting member 220 and the display panel 100. According to the testing requirements, there may be one or multiple pressure exerting members 220.

As an embodiment, the fixing member 210 includes a sliding bar 213 and bearing parts 212 disposed on the sliding bar 213. The sliding bar 213 is horizontally disposed and perpendicular to the bearing parts 212. The bearing parts 212 can slide linearly on the sliding bar 213, and the bearing parts 212 are driven to move toward or away from each other to form the space.

Specifically, the sliding bar 213 is horizontally disposed. The bearing parts 212 are connected to the sliding bar 213 for bearing the display panel 100. The bearing parts 212 and the sliding bar 213 are perpendicular to each other. The above-mentioned two bearing parts 212 can slide on the sliding bar 213. The bearing parts 212 are driven to move toward or away from each other to make the bearing parts 212 move toward or away from each other, and further to adjust the size of the space formed by the fixing member 210. Adjusting the size of the space can satisfy the test requirements of different sizes of display panels 100.

Further, the device further includes an anti-slip part 214, which is movable relatively to the sliding bar 213 and for positioning the bearing parts 212. Disposing the anti-slip part 214 on the sliding bar 213 can effectively prevent the space between the fixing members 210 upon testing from changing, and further reduce the test error.

As an embodiment, there may be two pressure exerting members 220 in this embodiment. The positions of the two pressure exerting members 220 are movable, so that a gap between the pressure exerting members 220 is adjustable. Adjusting the size of the gap between the pressure exerting members 220 can satisfy the test requirements of different sizes of display panels.

The pressure exerting member 220 is used to exert a pressure on the display panel 100.

Figure 5:
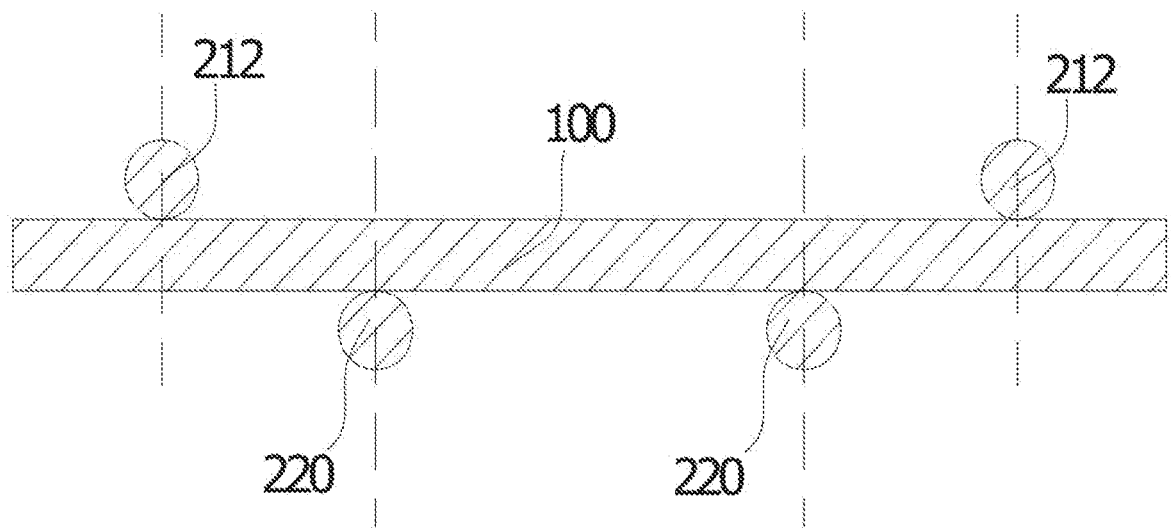
FIG. 5 is a schematic cross-section view showing a device in an embodiment of this disclosure.

FIG. 5 is a schematic cross-section view showing a device in an embodiment of this disclosure. Specifically referring to FIG. 5, fixing the display panel 100 vertically onto the fixing member 210 can effectively prevent the display panel 100 from sagging due to its own weight, and further influence the test result. In particular, in order to ensure the accuracy of the test results, each edge of the display panel 100 does not contact other objects when the display panel 100 is being tested.

In one embodiment, the fixing member 210 vertically fixes the display panel 100 onto the fixing member 210 through an adhesive smeared onto a contact surface between the fixing member 210 and the display panel 100.

In another embodiment, the device further comprises an air pump and a vacuum sucker disposed on the fixing member 210. The air pump vacuums air from the vacuum sucker, and the vacuum sucker sucks the display panel 100.

The driving device 230 drives the pressure exerting member 220 to move in a direction perpendicular to the display panel 100.

If the pressure exerted onto the display panel 100 is equal to a predetermined pressure for a predetermined time, then the driving device 230 further controls the pressure exerting member 220 to stop exerting the pressure onto the display panel 100. The predetermined pressure is a pressure for driving the display panel 100 to deform and reach a predetermined curvature.

In a specific embodiment, the driving device 230 is connected to the pressure exerting member 220. The driving device 230 includes a drive motor and a ball screw rod, wherein, the drive motor is a servo motor. The ball screw rod includes a screw, a nut, a steel ball, a preload sheet, an inverter and a dustproof device. A power output end of the drive motor is connected to the screw of the ball screw rod. The pressure exerting member 220 is connected to the nut of the ball screw rod through a nut seat. By the driving of the drive motor, the pressure exerting member 220 can linearly reciprocate on the ball screw rod, and the advantages of the high accuracy and the strong stability can be obtained. In particular, the ball screw rod is vertically connected to the pressure exerting member 220.

In other embodiments, the device further includes a debris collection member. The debris collection member is disposed below the display panel 100 upon testing, and can prevent the debris, produced by the broken display panel 100 during the testing process, from falling into the gap of the apparatus, and simplify the cleaning process.

In some embodiments, the display panel 100 includes, for example but without limitation to, a liquid crystal display panel (LCD), an organic light-emitting diode display panel (OLED), a field emission display panel (FED), a plasma display panel PDP and a curved panel. The liquid crystal panel includes a thin film transistor-liquid crystal display (TFT-LCD) panel 100, a TN (Twisted Nematic+Film) panel, a vertical alignment (VA) type panel, an in plane switching (IPS) panel, a COA panel and the like. In particular, the to-be-tested object in the bending test method may also be the above-mentioned various types of panels or other display panels.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A method for performing a bending test on a display panel, the method comprising steps of:
    providing a fixing member, a pressure exerting member and a driving device, and forming a space in the fixing member;
    fixing the display panel vertically onto the fixing member, wherein the display panel matches with the space to provide a corresponding space for deformation of the display panel;
    driving the pressure exerting member to move in a direction perpendicular to the display panel to exert a pressure onto the display panel;
    wherein if the pressure exerted onto the display panel is equal to a predetermined pressure for a predetermined time, then the driving device controls the pressure exerting member to stop exerting the pressure onto the display panel, and the predetermined pressure is a pressure required to drive the display panel to deform and reach a predetermined curvature,
    wherein the step of forming the space in the fixing member comprises:
    providing a sliding bar;
    disposing two bearing parts on the sliding bar, wherein the two bearing parts are capable of sliding linearly on the sliding bar;
    driving the bearing parts to move toward or away from each other to form the space.

2. The method according to claim 1, wherein the step of fixing the display panel vertically onto the fixing member comprises:
    smearing an adhesive onto a contact surface between the fixing member and the display panel, so that the display panel is vertically fixed onto the fixing member.

3. The method according to claim 1, wherein the step of fixing the display panel vertically onto the fixing member comprises:
    providing a vacuum sucker and an air pump;
    starting the air pump to vacuum air from the vacuum sucker and suck the display panel.

4. The method according to claim 1, further comprising steps of:

disposing an anti-slip part;
starting the anti-slip part to position the bearing parts.

5. The method according to claim 1, after driving the pressure exerting member to move in the direction perpendicular to the display panel to exert the pressure onto the display panel, the method further comprising a step of:
recording a magnitude of the pressure exerted upon being broken if the display panel gets broken.

6. The method according to claim 1, wherein there are two pressure exerting members.

7. The method according to claim 1, wherein a line connecting contact points between the fixing member and the display panel is parallel to a line connecting contact points between the pressure exerting member and the display panel.

8. A device for performing a bending test on a display panel, the device comprising:
a fixing member fixing the display panel vertically, wherein the fixing member is formed with a space, and the display panel matches with the space to provide a corresponding space for deformation of the display panel;
a pressure exerting member exerting a pressure onto the display panel;
a driving device driving the pressure exerting member to move in a direction perpendicular to the display panel;
wherein if the pressure exerted onto the display panel is equal to a predetermined pressure for a predetermined time, then the driving device further controls the pressure exerting member to stop exerting the pressure onto the display panel, and the predetermined pressure is a pressure for driving the display panel to deform and reach a predetermined curvature.

9. The device according to claim 8, wherein the fixing member vertically fixes the display panel onto the fixing member through an adhesive smeared onto a contact surface between the fixing member and the display panel.

10. The device according to claim 8, further comprising:
an air pump; and
a vacuum sucker disposed on the fixing member, wherein the air pump vacuums air from the vacuum sucker, and the vacuum sucker sucks the display panel.

11. The device according to claim 8, wherein there are two pressure exerting members.

12. The device according to claim 8, wherein the fixing member comprises a sliding bar, and bearing parts disposed on the sliding bar; the sliding bar is disposed horizontally and perpendicular to the bearing parts; and the bearing parts are movable linearly on the sliding bar, and are driven to move toward or away from each other to form the space.

13. The device according to claim 12, further comprising:
an anti-slip part, which is movable relatively to the sliding bar and positions the bearing parts.

14. A device for performing a bending test on a display panel, the device comprising:
a fixing member fixing the display panel vertically, wherein the fixing member is formed with a space, and the display panel matches with the space to provide a corresponding space for deformation of the display panel; the fixing member comprises a sliding bar, and bearing parts disposed on the sliding bar; and the bearing parts are movable linearly on the sliding bar, and are driven to move toward or away from each other to form the space;
a pressure exerting member exerting a pressure onto the display panel, wherein a line connecting contact points between the fixing member and the display panel is parallel to a line connecting contact points between the pressure exerting member and the display panel;
a driving device driving the pressure exerting member to move in a direction perpendicular to the display panel;
wherein if the pressure exerted onto the display panel is equal to a predetermined pressure for a predetermined time, then the driving device further controls the pressure exerting member to stop exerting the pressure onto the display panel, and the predetermined pressure is a pressure for driving the display panel to deform and reach a predetermined curvature.

15. The device according to claim 14, wherein the fixing member vertically fixes the display panel onto the fixing member through an adhesive smeared onto a contact surface between the fixing member and the display panel.

16. The device according to claim 14, further comprising:
an air pump; and
a vacuum sucker disposed on the fixing member, wherein the air pump vacuums air from the vacuum sucker, and the vacuum sucker sucks the display panel.

17. The device according to claim 14, wherein there are two pressure exerting members.

18. The device according to claim 14, wherein the sliding bar is disposed horizontally and perpendicular to the bearing parts.

19. The device according to claim 18, further comprising:
an anti-slip part, which is movable relatively to the sliding bar and positions the bearing parts.

* * * * *